United States Patent
Gao et al.

(10) Patent No.: US 10,325,743 B2
(45) Date of Patent: Jun. 18, 2019

(54) CIRCUIT BREAKERS WITH TAMPER-EVIDENT SECURITY SEALS

(71) Applicant: Eaton Corporation, Cleveland, OH (US)

(72) Inventors: Zhi Gao, Warrendale, PA (US); James L. Lagree, McKees Rocks, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 53 days.

(21) Appl. No.: 15/668,885

(22) Filed: Aug. 4, 2017

(65) Prior Publication Data

US 2019/0043683 A1    Feb. 7, 2019

(51) Int. Cl.
*H01H 71/02* (2006.01)
*H01H 71/04* (2006.01)
(Continued)

(52) U.S. Cl.
CPC .......... *H01H 71/025* (2013.01); *H01H 71/04* (2013.01); *G06K 19/0776* (2013.01);
(Continued)

(58) Field of Classification Search
CPC ................. H01H 71/025; H01H 71/04; H01H 2223/002; H01H 2239/032;
(Continued)

(56) References Cited

U.S. PATENT DOCUMENTS

| | | | | |
|---|---|---|---|---|
| 1,936,791 A | * | 11/1933 | Jennings | ................ H02B 1/00 361/643 |
| 2,302,551 A | * | 11/1942 | Jackson | ............. H01H 71/0214 337/109 |
| 2,354,157 A | * | 7/1944 | Swingle | ................ H01H 71/56 337/55 |
| 3,147,405 A | * | 9/1964 | Sturdivan | .......... H01H 71/0264 361/636 |
| 5,008,645 A | * | 4/1991 | Mrenna | ................ H01H 71/06 335/42 |

(Continued)

FOREIGN PATENT DOCUMENTS

EP    0 520 914 A1    12/1992
GB    2 267 062 A     11/1993

OTHER PUBLICATIONS

European Patent Office, "International Search Report and Written Opinion" (corresp. to PCT/IB18/055677, dated Oct. 19, 2018, 14 pages.

*Primary Examiner* — Edwin A. Leon
(74) *Attorney, Agent, or Firm* — Eckert Seamans (57) ABSTRACT

A circuit breaker assembly including a housing assembly and a tamper detection system. The housing assembly defines a sealed enclosure. The sealed enclosure includes a division interface. The sealed enclosure is structured to be in one of a closed, first configuration, wherein the sealed enclosure defines a generally enclosed space, and an open, second configuration, wherein the sealed enclosure allows access to the enclosed space, and wherein, as the sealed enclosure moves between the first configuration to the second configuration, the sealed enclosure is reconfigured at the division interface. The tamper detection system includes a protective assembly and an indicator assembly. The protective assembly is structured to be coupled to the sealed enclosure at the division interface. The indicator assembly includes a rupturable construct. The rupturable construct is structured to transform from an intact, first configuration to a ruptured, second configuration.

18 Claims, 2 Drawing Sheets

(51) Int. Cl.
  *G06K 19/077* (2006.01)
  *H01H 71/74* (2006.01)
(52) U.S. Cl.
  CPC ............. *G06K 19/07798* (2013.01); *H01H 2071/7472* (2013.01); *H01H 2223/002* (2013.01); *H01H 2239/032* (2013.01); *H01H 2300/032* (2013.01); *H01H 2300/052* (2013.01)
(58) Field of Classification Search
  CPC .......... H01H 2300/052; H01H 71/123; H01H 83/20; H01H 71/0207; H01H 2083/201; H02H 1/0015
  USPC ........................................................ 200/293
  See application file for complete search history.

(56) References Cited

U.S. PATENT DOCUMENTS

| | | | | |
|---|---|---|---|---|
| 5,166,862 | A * | 11/1992 | Durivage, III | H01H 71/123 361/676 |
| 6,144,001 | A * | 11/2000 | Green | H01H 9/0264 200/304 |
| 6,255,923 | B1 | 7/2001 | Mason, Jr. et al. | |
| 7,049,516 | B1 * | 5/2006 | Haag | H02B 1/38 174/481 |
| 9,877,383 | B2 * | 1/2018 | Brodsky | H05K 5/0208 |
| 2007/0069895 | A1 | 3/2007 | Koh | |
| 2016/0057856 | A1 * | 2/2016 | Woodford | H05K 1/0213 361/748 |
| 2017/0181274 | A1 * | 6/2017 | Brodsky | H05K 5/0208 |

* cited by examiner

CIRCUIT BREAKERS WITH TAMPER-EVIDENT SECURITY SEALS

BACKGROUND OF THE INVENTION

Field of the Invention

The disclosed and claimed concept relates to circuit breakers and, more particularly, to circuit breakers with tamper-evident security seals.

Background Information

Circuit breakers (as well as switchgears and other electrical equipment, hereinafter and collectively "circuit breakers") are designed to provide protection for power distribution systems. Circuit breakers safeguard connected electrical devices against current overloads and short circuits thereby protecting people and equipment in the field. A circuit breaker includes a housing assembly that encloses elements of a conductor assembly, an operating mechanism, a trip unit, as well as other elements. The enclosed elements must be made and maintained according to the manufacturer's specifications.

Circuit breakers, or specific elements thereof such as, but not limited to, the trip units, purchased from unauthorized online resellers and unauthorized local dealers are often of unknown conditions and origins, including, but not limited to, counterfeit circuit breakers or circuit breaker elements. Such circuit breakers/elements, despite being frequently advertised as "new," may turn out to be reconditioned or have been tampered with. Such circuit breakers/elements expose users to substantial safety risks and liability, as well as potential lost production revenues.

From an ordinary user's perspective, improperly reconditioned or counterfeit circuit breakers and circuit breaker elements are hard to spot. Ordinary users may not have sufficient technical knowledge and experience to detect any unauthorized product or improper reconditioning/tampering. That is, a problem with known circuit breakers is that they do not include a device for detecting original circuit breakers, i.e., circuit breakers made by the manufacturer and/or circuit breakers that have been tampered with or improperly reconditioned.

There is, therefore, a need for an easy to use system and method to detect counterfeit circuit breaker/elements and/or unauthorized reconditioning or tampering of circuit breakers/elements.

SUMMARY OF THE INVENTION

These needs, and others, are met by at least one embodiment of the disclosed and claimed concept which provides a circuit breaker assembly including a housing assembly and a tamper detection system. The housing assembly defines a sealed enclosure. The sealed enclosure includes a division interface. The sealed enclosure is structured to be in one of a closed, first configuration, wherein the sealed enclosure defines a generally enclosed space, and an open, second configuration, wherein the sealed enclosure allows access to the enclosed space, and wherein, as the sealed enclosure moves between the first configuration to the second configuration, the sealed enclosure is reconfigured at the division interface. The tamper detection system includes a protective assembly and an indicator assembly. The protective assembly is structured to be coupled to the sealed enclosure at the division interface. The protective assembly is further structured to transition among an original, first configuration and a used, second configuration. The indicator assembly includes a rupturable construct. The rupturable construct is structured to transform from an intact, first configuration to a ruptured, second configuration. The rupturable construct is integrated with the protective assembly. In this configuration, the indicator assembly is structured to indicate the configuration of the rupturable construct.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. Further, unitary elements such as, but not limited to, passages within a housing are, as used herein, "coupled" to the housing. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. For example, a rupturable construct is "operatively coupled" to one or more base elements when selected movements of the base elements cause the rupturable construct to rupture. It is noted that a first element may be "operatively coupled" to another without the opposite being true.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve as a whole, moves relative to the body of the automobile.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). For example, the phrase "a number of [x]" means one or more of "[x]."

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can.

As used herein, "generally curvilinear" includes elements having multiple curved portions, combinations of curved portions and planar portions, and a plurality of planar portions or segments disposed at angles relative to each other thereby forming a curve.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

As used herein, a "computer" is a device structured to process data having at least one input device, e.g., a keyboard, mouse, or touch-screen, at least one output device, e.g., a display, a graphics card or similar control for a display, a communication device, e.g., an Ethernet card or wireless communication device, permanent memory, e.g., a hard drive or flash memory, temporary memory, i.e., random access memory, and a processor, e.g., a programmable logic circuit ("PLC"). The "computer" may be a traditional desktop unit but also includes cellular telephones, tablet computers, laptop computers, as well as other devices, such as gaming devices that have been adapted to include components such as, but not limited to, those identified above. Further, the "computer" may include components that are physically in different locations. For example, a desktop unit may utilize a remote hard drive for storage. Such physically separate elements are, as used herein, a "computer."

As used herein, the word "display" means a device structured to present a visible image. Further, as used herein, "present" means to create an image on a display which may be seen by a user.

As used herein, a "computer readable medium" includes, but is not limited to, hard drives, CDs, DVDs, magnetic tape, floppy drives, and random access memory.

As used herein, "permanent memory" means a computer readable storage medium and, more specifically, a computer readable storage medium structured to record information in a non-transitory manner. Thus, "permanent memory" is limited to non-transitory tangible media.

As used herein, "stored in the permanent memory" means that a module of executable code, or other data, has become functionally and structurally integrated into the storage medium.

As used herein, a "file" is an electronic storage means for containing executable code that is processed, or, data that may be expressed as text, images, audio, video or any combination thereof.

As used herein, a "module" is an electronic construct used by a computer and includes, but is not limited to, a computer file or a group of interacting computer files such as an executable code file and data storage files, used by a processor and stored on a computer readable medium. Modules may also include a number of other modules. It is understood that modules may be identified by their purpose of function, but the "module" is still an electronic construct and not just the identified function. Unless noted otherwise, each "module" is stored in permanent memory of at least one computer or computer-like device.

As used herein, "structured to [verb]" when used in relation to a module, or an element containing a module, means that the module, or element including the module, includes executable computer instructions, code, or similar elements, as well as any other needed electronic constructs such as, but not limited to a database or data module, that performs the identified task.

As used herein, a "sealed enclosure" means a construct that defines an "enclosed space" and that is structured to move between at least two configurations; a closed, first configuration, wherein the sealed enclosure defines a generally enclosed space, and an open, second configuration, wherein the sealed enclosure allows access to the enclosed space. As used herein, an "enclosure" defining an "enclosed space" is not limited, for example, to a hermetically sealed space and includes constructs with openings so long as the opening is not sufficiently large so as to remove an element/assembly from within the enclosed space. Further, a "sealed enclosure" may define an "enclosed space" for certain elements but not others. For example, a stapler defines an "enclosed space" for a strip of staples (staples bonded together) because the strip of staples can only be inserted when the stapler is open. The stapler is not, however, a "sealed enclosure" for a single staple because a single staple can be ejected through the forward opening in the stapler.

As used herein, a "division interface" means an interface on a sealed enclosure that is reconfigured when the sealed enclosure moves between the first configuration and the second configuration. For example, if the sealed enclosure is defined by a separable two-part housing, the "division interface" is the interface between the two parts of the housing. Further, if the sealed enclosure is defined by a separable two-part housing coupled by a living hinge, i.e., a thin flexible hinge (flexure bearing) made from the same material as the two rigid pieces it connects, the "division interface" includes the living hinge even though the two parts of the housing never fully separate.

As used herein, a "rupturable construct" is a construct structured to transform from an intact, first configuration capable of transmitting a signal and/or carry a current to a ruptured, second configuration that is not capable of transmitting a signal and/or carrying a current, and, wherein an internal element of the "rupturable construct" changes configuration as the "rupturable construct" transforms from the first configuration to the second configuration. In an exemplary embodiment, a "rupturable construct" includes wires that are easily damaged. Further, as used herein, a "rupturable construct" does not include a body having dye/chemical filled, fracturable passages wherein the passages fracture when the body is bent and the dye/chemicals become/are visible. That is, as used herein, a construct that relies upon a visual change that is perceptible to humans is specifically excluded from the definition of "rupturable construct." Further, a homogenous construct, such as paper/plastic with adhesive on one side, i.e., a "sticker," is not a "rupturable construct" in that no internal element exists. That is, as used herein, a construct, such as paper/plastic with adhesive on one side, is specifically excluded from the definition of "rupturable construct."

As used herein, "transform" means a change in configuration that cannot be easily reversed. For example, a door is structured to move from a first, open configuration to a closed, second configuration and can be easily moved back to the first configuration. Conversely, a glass bottle that is transformed from an intact configuration to a shattered configuration, e.g., by dropping the bottle on the floor, cannot be easily reconfigured to be an intact bottle. That is, melting the glass shards and recasting the bottle is not "easy" as used herein. Conversely, "transition," as used herein, means a change in configuration that can be easily reversed.

Figure 1:
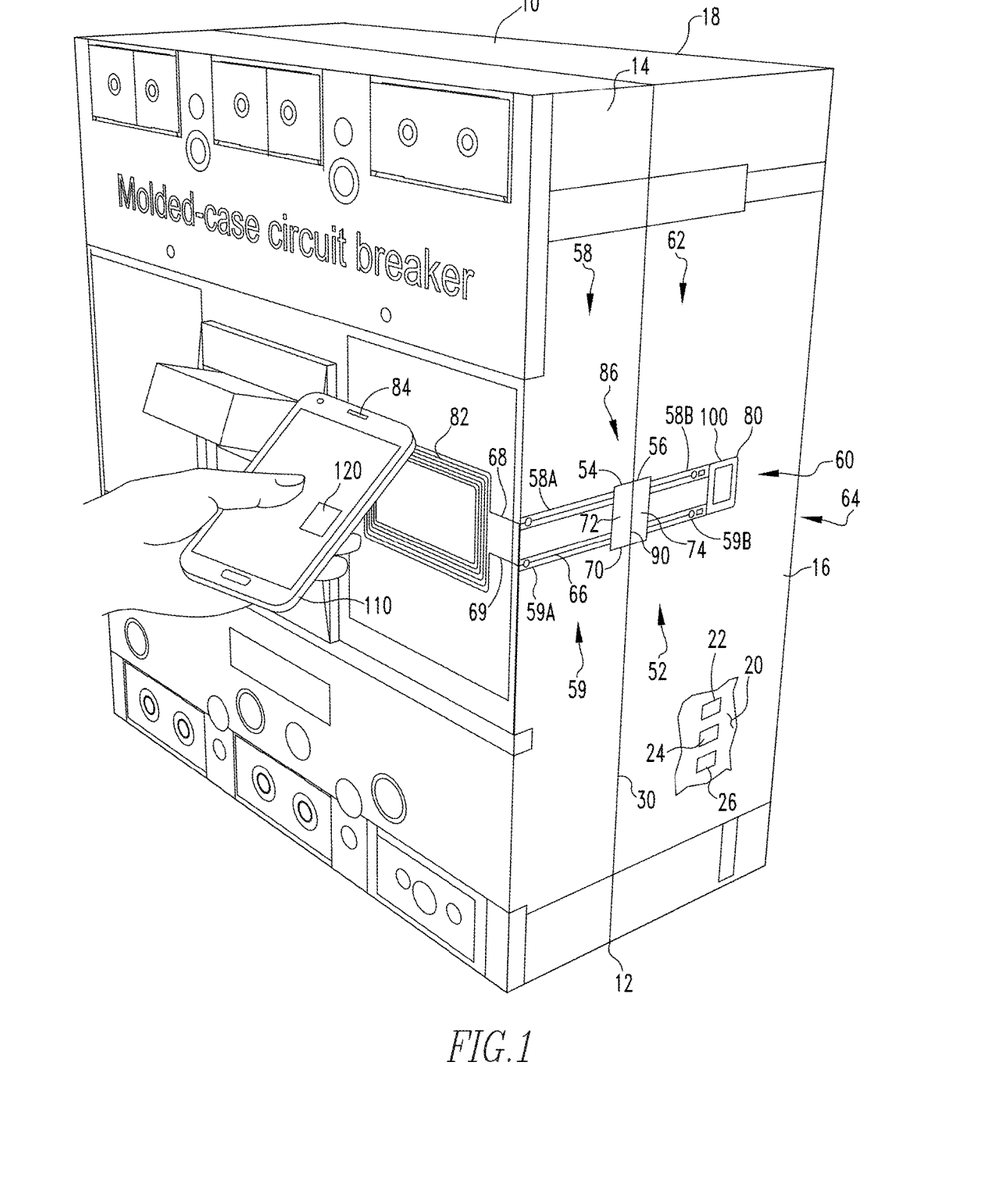
FIG. 1 is a schematic, isometric view of a circuit breaker with a tamper detection system.

As shown in FIG. 1, and in an exemplary embodiment, a circuit breaker 10 includes a housing assembly 12. As shown, the housing assembly 12 includes a first portion 14 and a second portion 16. The housing assembly 12, i.e., the housing assembly first portion 14 and the housing assembly second portion 16, define a sealed enclosure 18. As noted above, a sealed enclosure 18 is structured to move between at least two configurations; a closed, first configuration, wherein the sealed enclosure 18 defines a generally enclosed space 20, and an open, second configuration, wherein the sealed enclosure 18 allows access to the enclosed space 20. As shown, the enclosed space 20 is generally the entire space defined by the perimeter of the housing assembly 12. In other embodiments, not shown, the sealed enclosure 18 and the enclosed space 20 are a portion of the space defined by the perimeter of the housing assembly 12. For example, a housing assembly 12, in an exemplary embodiment (not shown), defines a pocket or small cavity into which an operating mechanism 24 is inserted. In this embodiment, the pocket for the operating mechanism 24 is the "enclosed space" and a cover for the pocket, as well as the portion of the housing assembly forming the pocket, defines the "sealed enclosure."

The enclosed space 20 is structured to substantially enclose a number of critical elements 22 (shown schematically). As used herein, a "critical element" is an element or assembly of a circuit breaker which directly effects the operation of the circuit breaker and includes an operating mechanism 24 and/or a trip unit 26. Other critical elements include an auxiliary switch, an under voltage relay, and a bell alarm switch, none shown. While the housing assembly 12 and/or the sealed enclosure 18 include small openings or passages (not numbered) the critical elements 22 cannot pass through such passages. Thus, in accordance with the definitions above, the housing assembly 12 defines a "sealed enclosure" 18 for the critical elements 22.

The sealed enclosure 18 includes a division interface 30, i.e., the interface where the housing assembly first portion 14 and the housing assembly second portion 16 meet when in a closed, first configuration. That is, the housing assembly first portion 14 and the housing assembly second portion 16 move between a closed, first configuration and an open, second configuration corresponding to the sealed enclosure 18 configurations described above. As the sealed enclosure 18 moves between the first configuration and the second configuration, the sealed enclosure 18 is reconfigured at the division interface 30. That is, in the embodiment shown, the housing assembly first portion 14 and the housing assembly second portion 16 separate at the division interface 30. As discussed below, a protective assembly 52 is coupled, directly coupled, fixed to, or unitary with the sealed enclosure 18 at, or across, the division interface 30. As such, a portion of the housing assembly first portion 14 is coupled, directly coupled, fixed to, or unitary with the protective assembly 52. The portion of the housing assembly first portion 14 that is associated with the protective assembly 52 is identified herein as the "sealed enclosure first portion" 54. Similarly, the portion of the housing assembly second portion 16 that is associated with the protective assembly 52 is identified herein as the "sealed enclosure second portion" 56. Stated alternately, the sealed enclosure 18 includes a first portion 54 disposed on a first side of the division interface 30 and a second portion 56 disposed on a second side of the division interface 30.

The circuit breaker 10 further includes a tamper detection system 60. The tamper detection system 60 includes the protective assembly 52 and an indicator assembly 64. In one embodiment, not shown, the protective assembly 52 is structured to be coupled, directly coupled, or fixed to the sealed enclosure 18 at the division interface 30. In an exemplary embodiment, the protective assembly 52 includes a number of passages, as shown a first passage 58 and a second passage 59 within the housing assembly first portion 14 and the housing assembly second portion 16. The passages 58, 59 extend across the division interface 30. That is, the passages 58, 59 each include a first portion 58A, 59A, and a second portion 58B, 59B wherein each passage first portion 58A, 59A is part of the housing assembly first portion 14 and each passage second portion 58B, 59B is part of the housing assembly second portion 16. In an initial configuration, the associated portions of the passages, i.e., first passage first portion 58A and first passage second portion 58B, and, second passage first portion 59A and second passage second portion 59B are aligned with each other and each form a continuous passage 58, 59. Further, in this configuration, each passage first portion 58A, 59A is a sealed enclosure first portion 54, as identified above, and each passage second portion 58B, 59B is sealed enclosure second portion 56, as identified above. As discussed below, a rupturable construct 66 such as, but not limited to, traces 68, 69, discussed below, extend through the passages 58, 59.

The passages 58, 59, i.e., the protective assembly 52, is structured to transition, or transform, between/from an original, first configuration and a used, second configuration. In an exemplary embodiment, and in the first configuration, the passages 58, 59 extend substantially straight across the division interface 30. Thus, in one embodiment, not shown, wherein a division interface 30 is defined by a living hinge, the passages 58, 59 are disposed across the division interface through the living hinge. In this embodiment, i.e., when a living hinge is utilized, the passages 58, 59 become bent, but are substantially returned to their original configuration. That is, each passage first portion 58A, 59A is not aligned with each passage second portion 58B, 59B. With a separable housing assembly 12, and in the second configuration, the passages 58, 59 are bent or divided at the division interface 30. When such a housing assembly 12 is reassembled, the passage first portions 58A, 59A are not aligned with the passage second portions 58B, 59B or do not align easily; thus, the passages 58, 59 are "transformed." Alternately, if the passages 58, 59 do align easily, the passages 58, 59 transition between configurations. Thus, if the housing assembly 12 is opened, the passages 58, 59, i.e., the protective assembly 52, transition, or transform, between/from an original, first configuration and/to a used, second configuration.

In another embodiment, shown in ghost, the protective assembly 52 includes a membrane body 70 that is structured to transition, or transform, between/from an original, first configuration and a used, second configuration. That is, in an exemplary embodiment, the protective assembly 52 includes a membrane body 70. As used herein, a "membrane body" 70 is a thin, planar body. In an exemplary embodiment, membrane body 70 includes an adhesive (not shown) on one of the planar sides. Thus, in one embodiment, not shown, wherein a division interface 30 is defined by a living hinge, a membrane body 70 is disposed across the division interface. In this embodiment, i.e., when a living hinge is utilized, the membrane body 70 "transitions" between the original, first configuration and the used, second configuration. In one embodiment, there is no evidence that the membrane body 70 has moved between the first and second configurations. That is, the membrane body 70, in this embodiment, does not tear, wrinkle, or otherwise transform. Similarly, in another embodiment wherein, as the sealed enclosure 18 moves between the first configuration and the second configuration, the housing assembly first portion 14 and the housing assembly second portion 16 separate, the membrane body 70 also "transitions" by having a portion of the membrane body 70 release the sealed enclosure 18 (i.e., the adhesive disengages from the sealed enclosure 18). In this embodiment, the membrane body 70 does not tear, wrinkle, or otherwise transform. In another embodiment, and again where, as the sealed enclosure 18 moves between the first configuration and the second configuration, the housing assembly first portion 14 and the housing assembly second portion 16 separate, the membrane body 70 "transforms." That is, in this embodiment, as the housing assembly first portion 14 and the housing assembly second portion 16 separate, the membrane body 70 tears or otherwise becomes visibly damaged.

As noted above, the sealed enclosure 18 includes a first portion 54 disposed on a first side of the division interface 30 and a second portion 56 disposed on a second side of the division interface 30. In this embodiment, the protective assembly membrane body 70 includes a first portion 72 structured to be coupled to the sealed enclosure first portion 54, and, a second portion 74 structured to be coupled to the sealed enclosure second portion 56. In this configuration, when the protective assembly 52 is in the original, first configuration, the protective assembly membrane body first portion 72 and the protective assembly membrane body second portion 74 are in a first position relative to each other, and, when the protective assembly 52 is in the used, second configuration, the protective assembly membrane body first portion 72 and the protective assembly membrane body second portion 74 are in a second position relative to each other.

The indicator assembly 64 includes a rupturable construct 66. The rupturable construct 66 is structured to transform from an intact, first configuration to a ruptured, second configuration. The rupturable construct 66 is integrated with the protective assembly 52. As used herein, "integrated" means to be coupled in a manner that cannot be decoupled without damaging/rupturing the rupturable construct 66. In an exemplary embodiment, the rupturable construct 66 is integrated with the protective assembly 52 by being disposed within the passages 58, 59 in the housing assembly 12. That is, any attempt to remove the rupturable construct 66 from the passages 58, 59 will damage/rupture the rupturable construct 66.

In an exemplary embodiment, the rupturable construct 66 includes a number (two shown) of "traces" 68, 69. As used herein, a "trace" is a conductive member that is easily damaged. Further, as used herein, an "elongated trace" is a trace having a length that is greater than the cross-sectional dimension(s) of the trace. In an exemplary embodiment, each trace 68, 69 is an elongated trace 68, 69. Each trace 68, 69 is disposed in, or embedded in, the housing assembly 12 and, in an exemplary embodiment, in an associated passage 58, 59. Each trace 68, 69 extends across the division interface 30. In an exemplary embodiment, the traces 68, 69 are generally parallel to each other. As discussed below, the traces 68, 69 are in electrical communication with a responsive unit 80. When the trace 68, 69 are disposed in, or embedded in, the housing assembly 12 at passages 58, 59, each trace 68, 69, and therefore the rupturable construct 66, is operatively coupled the housing assembly first portion 14 and the housing assembly second portion 16. That is, the rupturable construct 66 will transform from the first configuration to the second configuration when the housing assembly first portion 14 and the housing assembly second portion 16 transition/transform, between/from the original, first configuration and/to the used, second configuration.

In another embodiment with a membrane body 70, the traces 68, 69 are coupled, directly coupled, or fixed to the membrane body 70 and define a "flex circuit" 90. As used herein, a "flex circuit" means conductors printed on a flexible substrate. Otherwise, the flex circuit 90 operates in a manner similar to the embodiment described above. That is, in an embodiment with a membrane body 70, the rupturable construct 66 is operatively coupled to the protective assembly membrane body first portion 72 and the protective assembly membrane body second portion 74. In this configuration, as the protective assembly 52, and in the embodiment shown, the membrane body 70, transitions/transforms from the original, first configuration to the used, second configuration, the rupturable construct 66 transforms from the intact, first configuration to the ruptured, second configuration. In an embodiment with a protective assembly membrane body first portion 72 and a protective assembly membrane body second portion 74, the rupturable construct 66 transforms from the intact, first configuration to the ruptured, second configuration when the protective assembly membrane body first portion 72 and the protective assembly membrane body second portion 74 move from the first position relative to each other to the second position relative to each other.

The indicator assembly 64 is structured to indicate the configuration of the rupturable construct 66. In an exemplary embodiment, the indicator assembly 64 includes a responsive unit 80, an antenna 82, and a detection unit 84.

As used herein, a "responsive unit" 80 means a device structured to receive energy from a wireless signal and produce a response. A "responsive unit" 80 in an exemplary embodiment is, but is not limited to, a radio-frequency identification (RFID) device 100. In an exemplary embodiment, the antenna 82 is coupled, directly coupled, or fixed to an exposed surface of the housing assembly 12 (as shown, on housing assembly first portion 14) and the responsive unit 80 is coupled, directly coupled, or fixed to the other portion of the housing assembly 12 (as shown, on housing assembly second portion 16). The responsive unit 80 and the antenna 82 are coupled by, and are in electrical communication via, the traces 68, 69. In this configuration, the responsive unit 80, the antenna 82, and the traces 68, 69 form a circuit 86.

Thus, in this embodiment, the rupturable construct 66 is a circuit 86 structured to generate a response signal upon receiving a test signal. That is, the detection unit 84 is structured to, and does, generate a test signal that excites the antenna 82 and generates energy therein. The energy is conducted to the responsive unit 80 by the traces 68, 69. The responsive unit 80 then generates a response signal that is conducted to the antenna 82 by the traces 68, 69. The response signal causes a change in a characteristic in the antenna 82 that is detectable by the detection unit 84. In an exemplary embodiment, the change in a characteristic is a load modulation. The change in a characteristic in the antenna 82 is, as used herein, an "indication signal." That is, the antenna 82 is structured to, and does, transmit an indication signal. Thus, the rupturable construct circuit 86 is a circuit structured to generate an indication signal upon receiving a test signal. Further, in an exemplary embodiment, the response signal, and therefore the indication signal, includes data such as data representing the model of the circuit breaker 10, the manufacture date of the circuit breaker 10, a quality and process control (QPC) code, and a unique serial number. Incorporation of data in the response signal and indication signal is known and is one purpose of an RFID device 100. The electronic identification code, in an exemplary embodiment, also includes data representing the circuit breaker 10 authorized sale region, the circuit breaker 10 product website address, a technical service phone number(s) and/or contact information, the circuit breaker 10 current sensor attribute(s) and the circuit breaker 10 design revision number(s).

It is understood that the response signal from the responsive unit 80 can only be transmitted to the antenna 82 when the rupturable construct 66, i.e., the traces 68, 69 and/or the circuit 86, is in the first configuration. When the rupturable construct 66 is in the second configuration, no response signal is generated. This lack of a response signal, however, is in itself a response and, as used herein, the lack of a response signal is a "second response signal." The indicator assembly 64 is structured to, and does, produce an indication signal corresponding to the response signal.

That is, in an exemplary embodiment, the indicator assembly 64 is structured to, and does, produce one of two indication signals depending upon the configuration of the rupturable construct 66. If the rupturable construct 66 is in the first configuration, the indication signal exists and, in an exemplary embodiment, includes data as discussed above. As used herein, such a signal is a "first indication signal." If the rupturable construct 66 is in the second configuration, the indication signal is not generated and does not exist. As used herein, the lack of an indication signal is a form of an indication signal and is, as used herein, a "second indication signal."

The detection unit 84, in an exemplary embodiment, is a communication device such as, but not limited to, an RFID reader. As shown, the detection unit 84 is a communication device 110 structured to communicate with the RFID 100. The communication device 110, in an exemplary embodiment, is a "smart" cellular telephone or similar portable electronic device, which is a "computer" as defined above. The communication device 110 includes modules structured to perform the functions identified herein. In this embodiment, the communication device 110 is structured to display an indication related to the indication signal. Further, in an exemplary embodiment, the detection unit 84 includes a control interface 120, such as, but not limited to an executable module included in the detection unit 84. The control interface 120, shown as an application (or "app.") on a detection unit 84, includes an input construct, e.g., a "button" on a touch screen that is structured to, and does, produce the test signal when actuated. The control interface 120 is further structured to present information related to the first indication signal or the second indication signal. In an exemplary embodiment, the detection unit 84 is structured to send the test signal a number of times before the control interface 120 presents information related to the first indication signal or the second indication signal. Thus, the detection unit 84 is structured to, and does, receive the indication signal. The detection unit 84 is further structured to, and does, produce a sign related to the indication signal. As used herein, a "sign" is an output that is perceptible by an observer. The sign presents information, e.g., to data discussed above, that the rupturable construct 66 is intact and that the circuit breaker 10 is acceptable, or, the sign presents information, e.g., a flashing red light, that the rupturable construct 66 is not intact and that the circuit breaker 10 is not acceptable. Thus, the detection unit 84 is structured to, and does, receive a first indication signal and to produce a first sign, and, the detection unit 84 is structured to, and does, receive a second indication signal and to produce a second sign.

Figure 2:
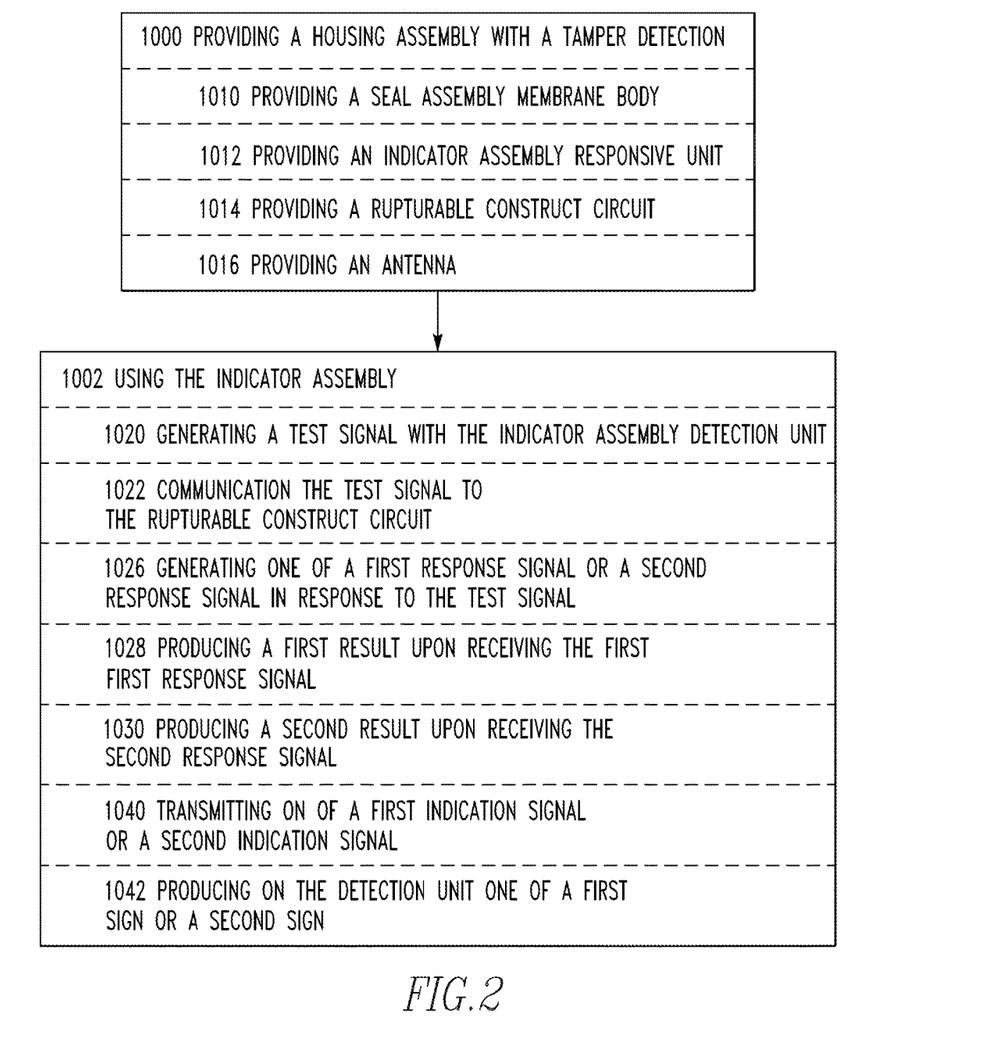
FIG. 2 is a flowchart of the disclosed method.

Accordingly, a method of using a circuit breaker 10 with a tamper detection system 60 includes, providing 1000 a housing assembly with a tamper detection, the housing assembly defining a sealed enclosure for critical components, the sealed enclosure including a division interface, the sealed enclosure structured to be in one of a closed, first configuration, wherein the sealed enclosure defines a generally enclosed space, and an open, second configuration, wherein the sealed enclosure allows access to the enclosed space, and wherein as the sealed enclosure moves between the first configuration and the second configuration, the sealed enclosure is reconfigured at the division interface, the tamper detection system including a protective assembly and an indicator assembly, the protective assembly structured to be coupled to the sealed enclosure at the division interface, the protective assembly further structured to transition among an original, first configuration and a used, second configuration, the indicator assembly including a rupturable construct, the rupturable construct structured to transform from an intact, first configuration to a ruptured, second configuration, the rupturable construct integrated with the protective assembly, the indicator assembly structured to indicate the configuration of the rupturable construct (hereinafter "providing 1000 a housing assembly with a tamper detection"), and, using 1002 the indicator assembly to provide an indication of the configuration of the rupturable construct (hereinafter "using 1002 the indicator assembly").

Providing 1000 a housing assembly with a tamper detection also includes providing 1010 a protective assembly membrane body, providing 1012 an indicator assembly responsive unit 80, providing 1014 a rupturable construct circuit, and providing 1016 an antenna 82 and a detection unit 84. Using 1002 the indicator assembly also includes generating 1020 a test signal with the indicator assembly detection unit 84, communicating 1022 the test signal to the rupturable construct circuit, generating 1026 one of a first response signal or a second response signal in response to the test signal, producing 1028 a first result upon receiving the first response signal, producing 1030 a second result upon receiving the second response signal, transmitting 1040 one of a first indication signal or a second indication signal, and producing 1042 on the detection unit one of a first sign or a second sign.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A tamper detection system for a circuit breaker assembly, said circuit breaker assembly including a housing assembly, said housing assembly defining a sealed enclosure for critical elements, said sealed enclosure including a division interface, said sealed enclosure structured to be in one of a closed, first configuration, wherein said sealed enclosure defines a generally enclosed space, and an open, second configuration, wherein said sealed enclosure allows access to said enclosed space, and wherein as said sealed enclosure moves between said first configuration and said second configuration, said sealed enclosure is reconfigured at said division interface, said tamper detection system comprising:
    a protective assembly structured to be coupled to said sealed enclosure at said division interface;
    said protective assembly further structured to transition among an original, first configuration and a used, second configuration;
    said protective assembly includes a number of passages in said housing assembly;
    each passage extending across said division interface;
    an indicator assembly including a rupturable construct;
    said rupturable construct structured to transform from an intact, first configuration to a ruptured, second configuration;
    said rupturable construct integrated with said protective assembly;
    said rupturable construct includes a number of traces;
    each trace disposed in an associated passage and extending across said division interface; and
    said indicator assembly structured to indicate the configuration of said rupturable construct.

2. The tamper detection system of claim 1 wherein:
    wherein, when said protective assembly is in said original, first configuration, said rupturable construct is in said intact, first configuration; and
    wherein said rupturable construct is structured to transform from said intact, first configuration to said ruptured, second configuration as said protective assembly transitions from said original, first configuration to said used, second configuration.

3. The tamper detection system of claim 1 wherein said sealed enclosure includes a first portion disposed on a first side of said division interface and a second portion disposed on a second side of said division interface, and wherein:
    said protective assembly includes a membrane body;
    said protective assembly membrane body including a first portion structured to be coupled to said sealed enclosure first portion, and, a second portion structured to be coupled to said sealed enclosure second portion;
    wherein, when said protective assembly is in said original, first configuration, said protective assembly membrane body first portion and said protective assembly membrane body second portion are in a first position relative to each other, and, when said protective assembly is in said used, second configuration, said protective assembly membrane body first portion and said protective assembly membrane body second portion are in a second position relative to each other;
    said rupturable construct operatively coupled to said protective assembly membrane body first portion and said protective assembly membrane body second portion; and
    wherein said rupturable construct is structured to transform from said intact, first configuration to said ruptured, second configuration when said protective assembly membrane body first portion and said protective assembly membrane body second portion move from said first position relative to each other to said second position relative to each other.

4. The tamper detection system of claim 3 wherein:
    said rupturable construct includes a flex circuit; and
    said indicator assembly includes a radio-frequency identification device.

5. The tamper detection system of claim 1 wherein said housing assembly includes a first portion disposed on a first side of said division interface and a second portion disposed on a second side of said division interface, said housing assembly first portion and said housing assembly second portion move between a closed, first configuration and an open, second configuration, and wherein:
    said rupturable construct is operatively coupled to said housing assembly first portion and said housing assembly second portion; and
    wherein said rupturable construct is structured to transform from said intact, first configuration to said ruptured, second configuration when said housing assembly first portion and said housing assembly second portion move from said first configuration to said second configuration.

6. The tamper detection system of claim 5 wherein each trace is operatively coupled to said housing assembly first portion and said housing assembly second portion.

7. The tamper detection system of claim 5 wherein:
    said indicator assembly includes a responsive unit;
    said rupturable construct includes a circuit;
    said rupturable construct circuit structured to generate a response signal upon receiving a test signal; and
    said rupturable construct circuit structured to produce a first response signal to said test signal when said rupturable construct is in said intact, first configuration, and, said rupturable construct circuit structured to produce a second response signal to said test signal when said rupturable construct is in said ruptured, second configuration.

8. The tamper detection system of claim 7 wherein:
    said indicator assembly includes a detection unit and an antenna;
    said antenna structured to transmit an indication signal;

said detection unit structured to receive said first indication signal and to produce a first sign; and
said detection unit structured to receive said second indication signal and to produce a second sign.

9. A circuit breaker assembly comprising:
a housing assembly defining a sealed enclosure for critical element;
said sealed enclosure including a division interface;
said sealed enclosure structured to be in one of a closed, first configuration, wherein said sealed enclosure defines a generally enclosed space, and an open, second configuration, wherein said sealed enclosure allows access to said enclosed space, and wherein as said sealed enclosure moves between said first configuration and said second configuration, said sealed enclosure is reconfigured at said division interface;
a tamper detection system including a protective assembly and an indicator assembly;
said protective assembly structured to be coupled to said sealed enclosure at said division interface;
said protective assembly further structured to transition among an original, first configuration and a used, second configuration;
said protective assembly includes a number of passages in said housing assembly;
each passage extending across said division interface;
said indicator assembly including a rupturable construct;
said rupturable construct structured to transform from an intact, first configuration to a ruptured, second configuration;
said rupturable construct integrated with said protective assembly;
said rupturable construct includes a number of traces;
each trace disposed in an associated passage and extending across said division interface; and
said indicator assembly structured to indicate the configuration of said rupturable construct.

10. The circuit breaker assembly of claim 9 wherein:
wherein, when said protective assembly is in said original, first configuration, said rupturable construct is in said intact, first configuration; and
wherein said rupturable construct is structured to transform from said intact, first configuration to said ruptured, second configuration as said protective assembly transitions from said original, first configuration to said used, second configuration.

11. The circuit breaker assembly of claim 9 wherein:
said sealed enclosure includes a first portion disposed on a first side of said division interface and a second portion disposed on a second side of said division interface;
said protective assembly includes a membrane body;
said protective assembly membrane body including a first portion structured to be coupled to said sealed enclosure first portion, and, a second portion structured to be coupled to said sealed enclosure second portion;
wherein, when said protective assembly is in said original, first configuration, said protective assembly membrane body first portion and said protective assembly membrane body second portion are in a first position relative to each other, and, when said protective assembly is in said used, second configuration, said protective assembly membrane body first portion and said protective assembly membrane body second portion are in a second position relative to each other;
said rupturable construct operatively coupled to said protective assembly membrane body first portion and said protective assembly membrane body second portion; and
wherein said rupturable construct transforms from said intact, first configuration to said ruptured, second configuration when said protective assembly membrane body first portion and said protective assembly membrane body second portion move from said first position relative to each other to said second position relative to each other.

12. The circuit breaker of claim 11 wherein:
said rupturable construct includes a flex circuit; and
said indicator assembly includes a radio-frequency identification device.

13. The circuit breaker of claim 9 wherein said housing assembly includes a first portion disposed on a first side of said division interface and a second portion disposed on a second side of said division interface, said housing assembly first portion and said housing assembly second portion move between a closed, first configuration and an open, second configuration, and wherein:
said rupturable construct is operatively coupled to said housing assembly first portion and said housing assembly second portion; and
wherein said rupturable construct is structured to transform from said intact, first configuration to said ruptured, second configuration when said housing assembly first portion and said housing assembly second portion move from said first configuration to said second configuration.

14. The circuit breaker of claim 13 wherein each trace is operatively coupled to said housing assembly first portion and said housing assembly second portion.

15. The circuit breaker of claim 13 wherein:
said indicator assembly includes a responsive unit;
said rupturable construct includes a circuit;
said rupturable construct circuit structured to generate a response signal upon receiving a test signal; and
said rupturable construct circuit structured to produce a first response signal to said test signal when said rupturable construct is in said intact, first configuration, and, said rupturable construct circuit structured to produce a second response signal to said test signal when said rupturable construct is in said ruptured, second configuration.

16. The circuit breaker of claim 15 wherein:
said indicator assembly includes a detection unit and an antenna;
said antenna structured to transmit an indication signal;
said detection unit structured to receive said first indication signal and to produce a first sign; and
said detection unit structured to receive said second indication signal and to produce a second sign.

17. A method of using a circuit breaker with a tamper detection system comprising:
providing a housing assembly with a tamper detection, said housing assembly defining a sealed enclosure for critical elements, said sealed enclosure including a division interface, said sealed enclosure structured to be in one of a closed, first configuration, wherein said sealed enclosure defines a generally enclosed space, and an open, second configuration, wherein said sealed enclosure allows access to said enclosed space, and wherein as said sealed enclosure moves between said first configuration and said second configuration, said sealed enclosure is reconfigured at said division interface, said tamper detection system including a protective assembly and an indicator assembly, said protective assembly structured to be coupled to said sealed enclosure at said division interface, said protective assembly further structured to transition among an original, first configuration and a used, second configuration, said protective assembly includes a number of passages in said housing assembly, each passage extending across said division interface, said indicator assembly including a rupturable construct, said rupturable construct structured to transform from an intact, first configuration to a ruptured, second configuration, said rupturable construct integrated with said protective assembly, said rupturable construct includes a number of traces, each trace disposed in an associated passage and extending across said division interface; said indicator assembly structured to indicate the configuration of said rupturable construct; and using said indicator assembly to provide an indication of the configuration of said rupturable construct.

18. The method of claim 17 wherein providing a housing assembly with a tamper detection includes:

providing a protective assembly membrane body; and wherein said rupturable construct is operatively coupled to said protective assembly membrane body.

* * * * *